B. B. SWINNERTON.
WARE SUPPORT FOR CERAMIC FIRING.
APPLICATION FILED JAN. 15, 1920.
1,336,762.
Patented Apr. 13, 1920.
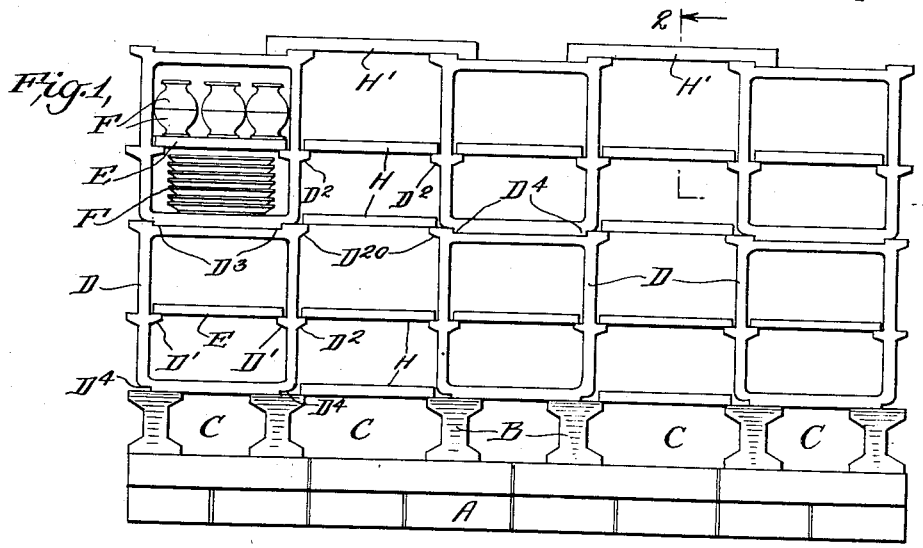
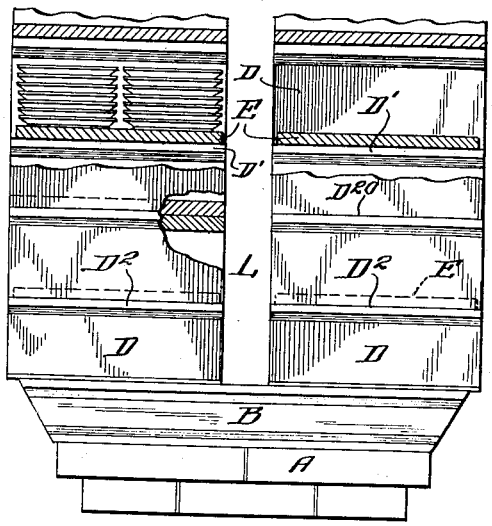
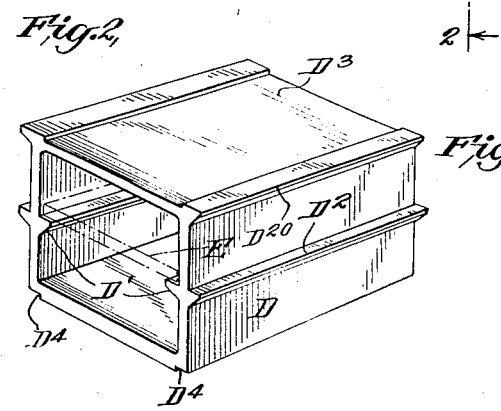
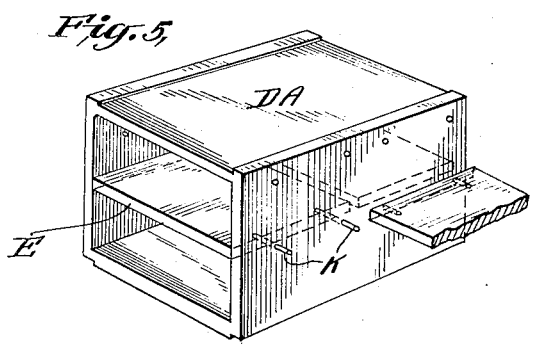
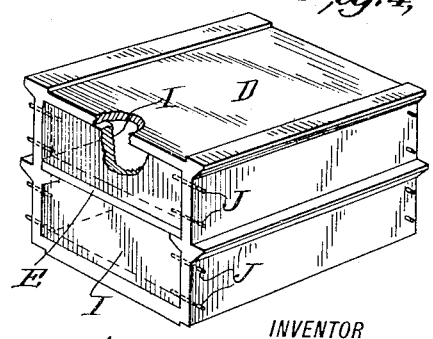
INVENTOR
Bertram B. Swinnerton
BY
John E. Hubbell
his ATTORNEY

UNITED STATES PATENT OFFICE.

BERTRAM B. SWINNERTON, OF BEAVER, PENNSYLVANIA, ASSIGNOR TO AMERICAN DRESSLER TUNNEL KILNS, INC., OF NEW YORK, N. Y., A CORPORATION OF NEW YORK.

WARE-SUPPORT FOR CERAMIC FIRING.

1,336,762.  Specification of Letters Patent.  Patented Apr. 13, 1920.

Application filed January 15, 1920. Serial No. 351,631.

*To all whom it may concern:*

Be it known that I, BERTRAM B. SWINNERTON, a subject of the King of Great Britain, and resident of Beaver, in the county of Beaver and State of Pennsylvania, have invented certain new and useful Improvements in Ware-Supports for Ceramic Firing, of which the following is a specification.

The general object of my present invention is to provide supports for ceramic ware in the firing operations to which such ware is subjected.

Heretofore the general practice has been to support ceramic ware while undergoing firing in receptacles known as saggars. The saggars commonly employed for this purpose are formed of fire clay and are in effect deep dishes or trays generally rectangular in plan but ordinarily formed with rounded corners. The saggars are ordinarily made by hand out of slabs of fire clay which must be bent into shape and fitted together to form the side walls and bottoms of the saggar. This method of construction results in seams in the side walls and between the side walls and bottoms of the saggars which frequently open in the initial firing of the saggars and after the saggars are put into use under the alternate heating and cooling to which they are then subjected. The heating and cooling strains also tend to create cracks in the saggars in operation. In the use of the saggars they are ordinarily filled with ware at a "setting bench" and must then be transported into a kiln and stacked up in bungs therein if the ware is to be fired in an ordinary intermittent kiln, and if the ware is to be fired in a continuous kiln, the saggars with the ware contained therein must be stacked up on the trucks or other apparatus employed to transport the saggars and ware through the continuous kiln. When the ware is fired the saggars must be returned to some convenient station for removal of the ware. The handling to which the saggars are thus subjected results in a considerable breakage of saggars and the ware contained therein and the extent of the breakage and attending loss thus occurring depend on the skill and care of the workmen handling the saggars. Another cause of ware breakage in saggars is due to the frequent warping of the saggar bottoms whereby when the saggars are stacked up the warped bottom of one saggar extends into the supporting saggar beneath it with a resulting breakage of the ware contained in the lower saggar.

One specific object of my invention is to provide a substitute for the ordinary saggar of such shape as to facilitate the insertion and removal of the ware therefrom, to minimize inequalities in form occurring during their manufacture or resulting from the stresses due to heating and cooling, and to permit of the formation of ware supports in an ordinary clay pipe machine. Another special object of the invention is to provide a ware supporting substitute for a saggar which may be mounted upon and form a permanent structure upon the trucks or cars of continuous tunnel kilns.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described preferred embodiments of my invention.

Of the drawings:

Figure 1 is a side elevation of the body portion of the ware supporting car of a continuous tunnel kiln with my improved ware supports mounted thereon.

Fig. 2 is an end elevation of the apparatus shown in Fig. 1 with parts broken away and in section on the broken line 2—2 of Fig. 1.

Fig. 3 is a perspective view of one of the ware supports shown in Figs. 1 and 2.

Fig. 4 is a perspective view of a ware support provided with removable end walls and Fig. 5 is a perspective view of a ware support of modified form.

In the construction shown in Figs. 1 and 2, A represents the refractory body portion of a car such as is commonly employed in the well known Dressler continuous tunnel kiln. At the top of the body portion of the car are transverse beams B which form supports for the load upon the truck and are spaced away from one another to provide air channels C extending transversely to the length of the car. Mounted upon the supporting beams B are two rows of my improved ware supports. The two rows of ware supports are shown as spaced away from one another at the center of the car to provide a longitudinal air channel L. As shown these ware supports comprise horizontally disposed tubular bodies D, rectangular in outline, and provided each with a pair of internal longitudinal ribs D' for supporting a shelf E and provided externally at each side with a rib $D^{20}$ at its upper edge, and approximately midway between its upper and lower edges with a second external rib $D^2$. As shown each row of ware supports comprises three columns of bodies D and shelves H mounted on the adjacent ribs $D^2$ and $D^{20}$ of each of the two adjacent pairs of columns. The columns of bodies D are so spaced apart as to provide open ended ware receiving spaces between the shelves H of approximately the same dimensions as the two ware receiving spaces in each body D formed above and below the shelf E mounted on its internal ribs D'. The ware receiving space above the uppermost shelf H in each tier of shelves H is shown as covered by a shelf H'. The bodies D are formed out of fire clay which may be of the same character as that ordinarily used in the manufacture of saggars and the shelves E, H and H' may be "bats" formed out of the same material. To facilitate the stacking up of the bodies D, and to avoid misplacement the top wall of each body D may be recessed as indicated at $D^3$, and the bottom wall may be formed with registering ribs or projections as indicated at $D^4$, so that the stacked up bodies D nest together. With the apparatus shown in Figs. 1 and 2 the ware may be easily inserted in and removed from the various ware supporting spaces without removing the tubular bodies D, or the various shelves from the car so that the bodies D and the various shelves may in practice form a part of the permanent car structure. The breakage of these parts due to repeated handling is thus avoided.

The apparatus shown in Figs. 1 and 2 and 3 is well adapted for use in a tunnel kiln of the Dressler type in which there is no risk of the ware being injured by free exposure to the atmosphere of the kiln. Where the kilns in which the ware is to be fired are open fire kilns or for other reasons it is necessary or desirable to protect the ware from free exposure to the kiln atmosphere, I may provide removable end closures for the bodies D. Thus as shown in Fig. 4 a separate plate or bat I is employed to close each otherwise open end of each ware receiving chamber. These removable end walls may readily be secured in place when this is necessary as by means of dowel pins J passing through holes formed for the purpose in the side walls of the bodies D.

In the modified construction illustrated in Fig. 5, the ware supporting body D A differs from the bodies D above described, only in the omission of the ribs D', $D^2$ and $D^{20}$, the shelf supporting function being performed in this case by means of pins passing through the side walls of the body D A.

Those skilled in the art will readily understand that the shapes of the bodies D and D A employed, not only permit of their ready manufacture in an ordinary clay pipe machine, but also, regardless of the method of manufacture, minimize the liability of the bodies being deformed or broken under the strains resulting from their alternate heating and cooling. The formation of the ware supports into a permanent portion of the cars of the tunnel kilns as shown in Figs. 1 and 2 eliminates the breakage of the ware supports and ware resulting from the handling to which the saggars of ordinary form are subjected.

While in accordance with the provisions of the statutes I have illustrated and described the best forms of my invention now known to me, it will be apparent to those skilled in the art that changes may be made in the form of the apparatus disclosed without departing from the spirit of the invention set forth in the appended claims and that certain features of my invention may sometimes be used to advantage without a corresponding use of other features.

Having now described my invention, what I claim as new and desire to secure by Letters Patent, is:

1. A ware support for ceramic firing consisting of an open ended tube of refractory material rectangular in cross section.

2. A ware support for ceramic firing comprising an open ended one piece tubular body of refractory material and bats removably closing the ends of said body.

3. A ware support for ceramic firing consisting of an open ended tube of refractory material rectangular in cross section and formed with an internal shelf supporting rib.

4. A ware support for ceramic firing comprising a supporting structure, columns mounted thereon formed of open ended horizontally disposed tubular bodies of refractory material provided with external projections and shelves mounted on the external projections of the bodies at the adjacent sides of adjacent columns.

5. A ware support for ceramic firing comprising a supporting structure, columns mounted thereon formed of open ended horizontally disposed tubular bodies of refractory material provided with internal and external projections and shelves mounted on the internal projections within the bodies and on the external projections of the bats at the adjacent sides of adjacent columns.

6. A ware support for ceramic firing comprising an open ended tubular body of refractory material and bats removably closing the ends of said bodies and dowel pins for securing said bats to said body.

Signed at Ford City, in the county of Armstrong and State of Pennsylvania, this 6th day of Decbr., A. D. 1919.

BERTRAM B. SWINNERTON.

Witness:
HOWARD D. STOUT.